Figure 1A:
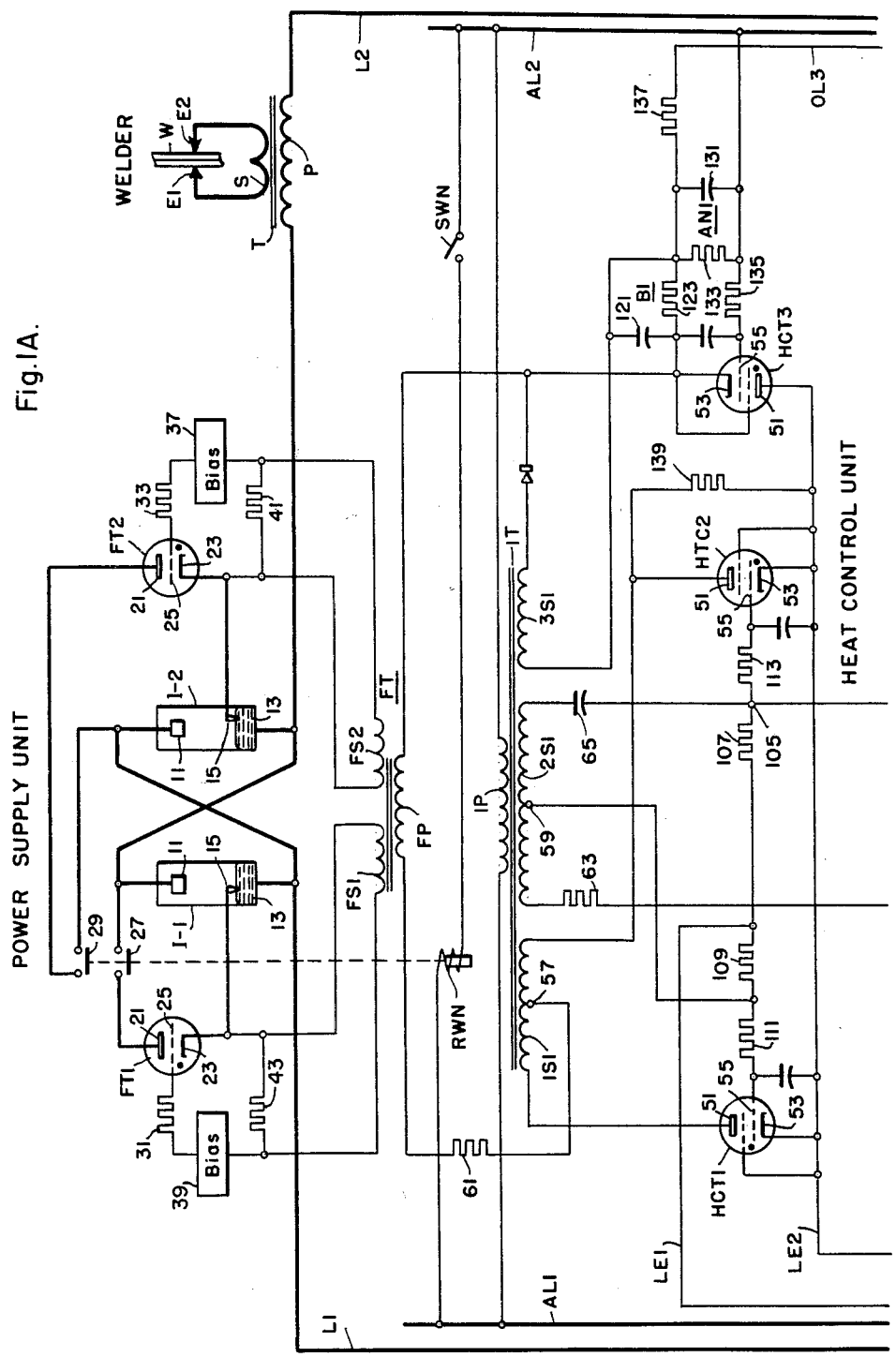
Figure 1B:
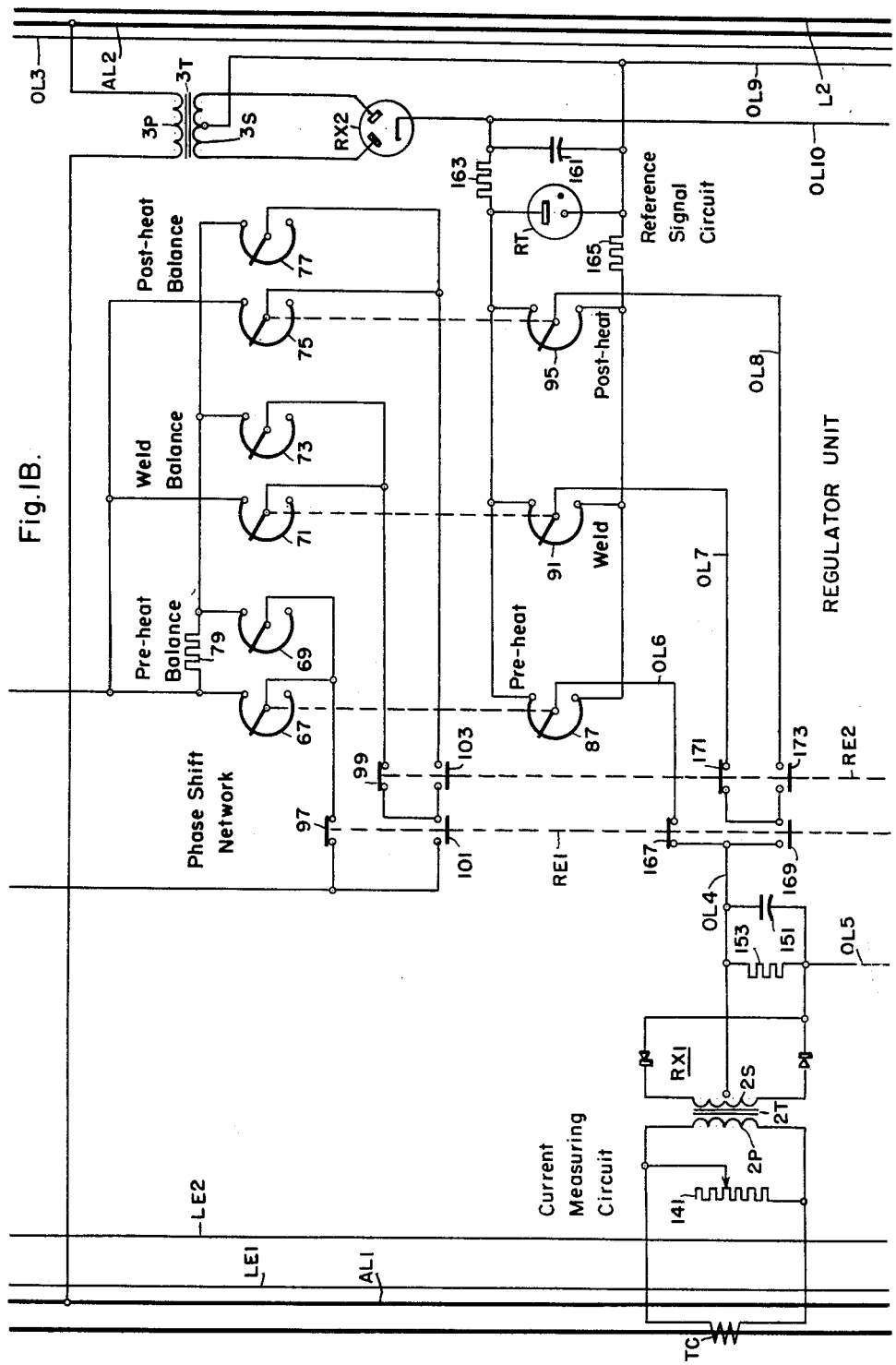

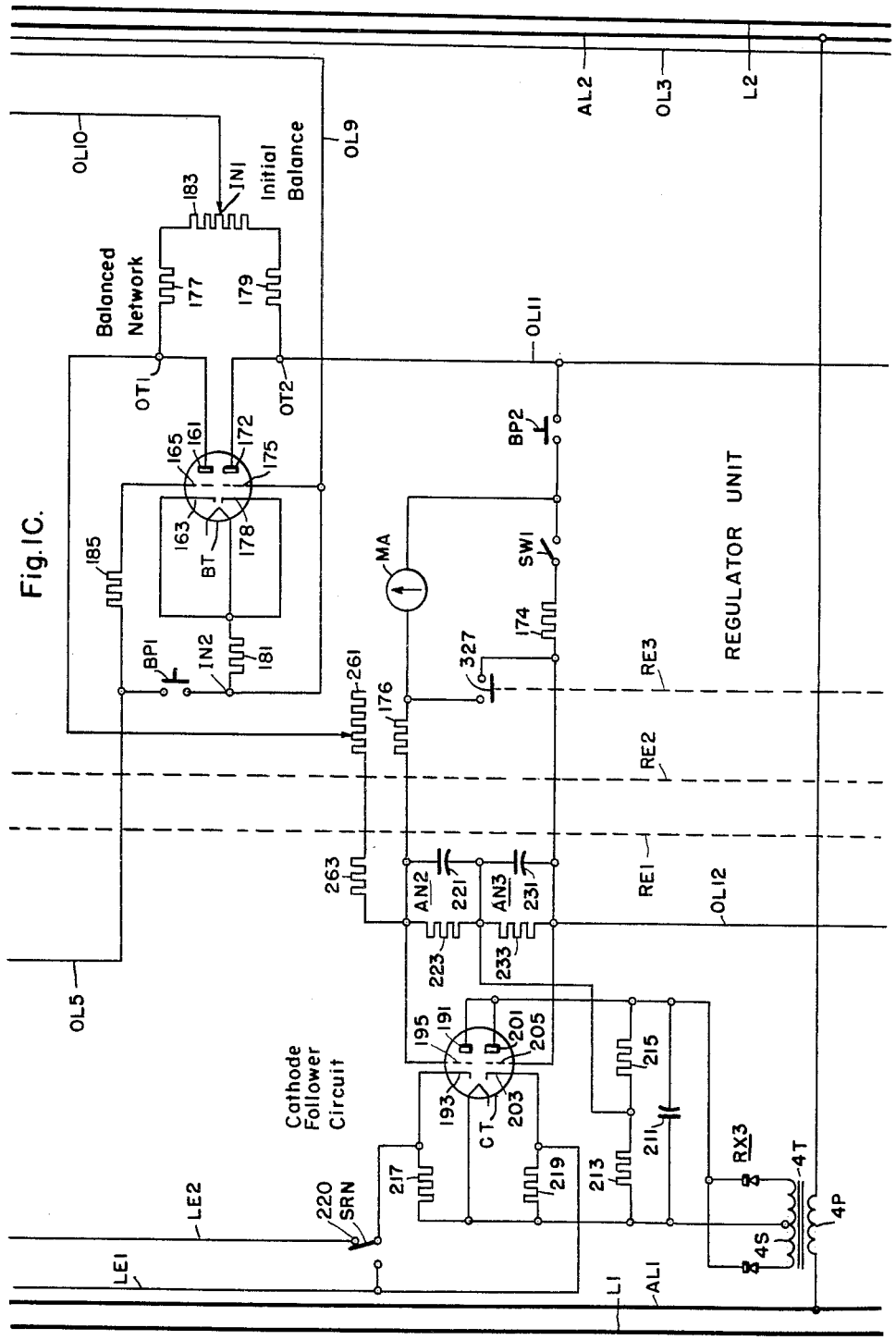

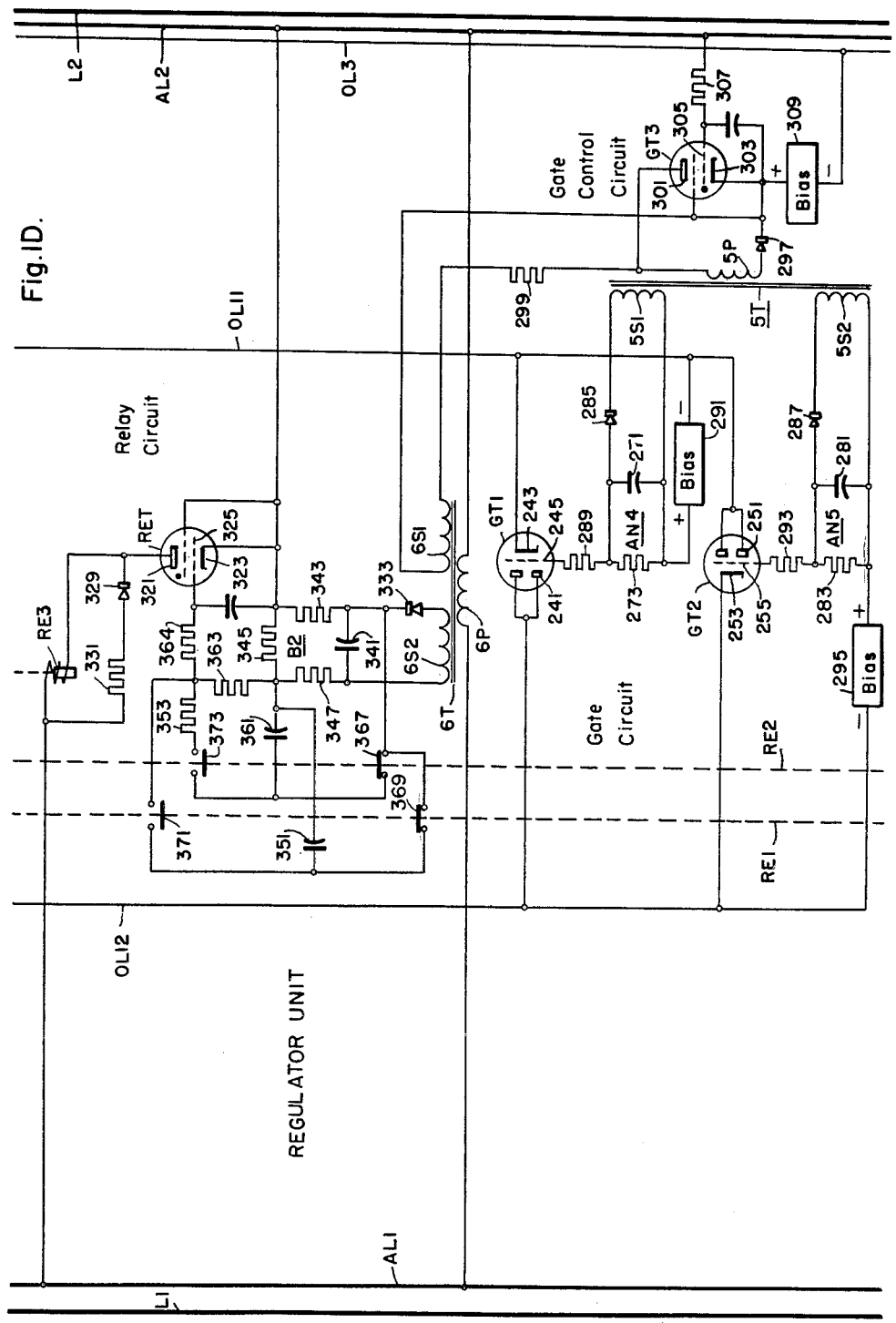
Fig. ID.

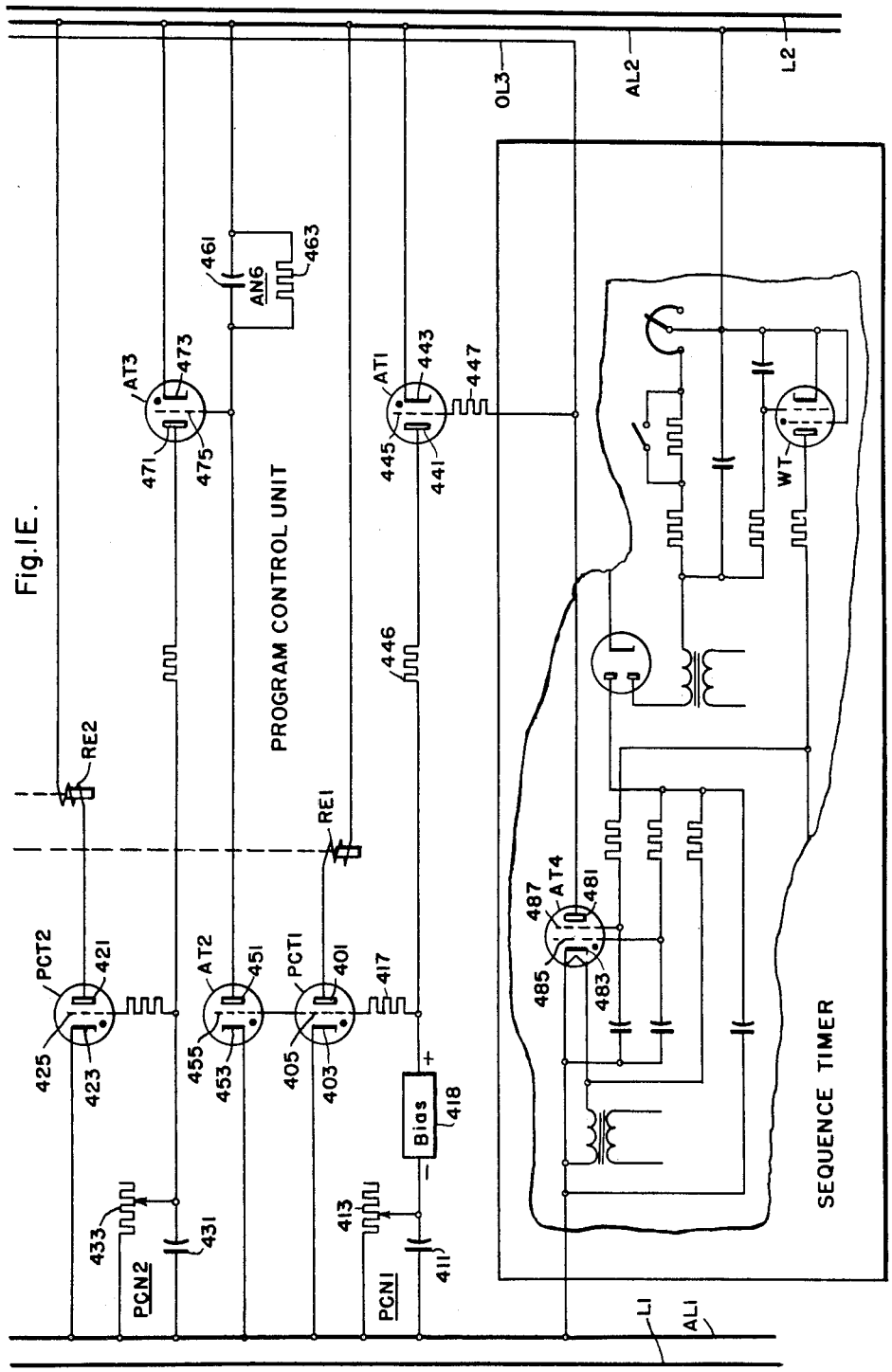

United States Patent Office

2,985,816
Patented May 23, 1961

2,985,816

VOLTAGE REGULATOR FOR INTERMITTENT CURRENT OPERATION

Donald R. Scholtes, Snyder, and William E. Large, Clarence, N.Y., assignors to Westinghouse Electric Corporation, East Pittsburgh, Pa., a corporation of Pennsylvania Original application Feb. 17, 1955, Ser. No. 488,928. Divided and this application July 10, 1958, Ser. No. 747,772

4 Claims. (Cl. 323—18)

Our invention relates to electric discharge apparatus and has particular relation to control apparatus for electric resistance welding. This application is a division of application Serial No. 488,928, filed February 17, 1955, and assigned to Westinghouse Electric Corporation. This application like its parent relates to Patent 2,833,978, granted May 6, 1958, to William E. Large and assigned to Westinghouse Electric Corporation, the latter patent being incorporated in this application by reference.

In electric resistance welding apparatus with which our invention particularly concerns itself, the welding current is supplied during discrete intermittent intervals of relatively short duration. Such apparatus is frequently used for welding such metals as aluminum, in the fabrication of aircraft parts, and when the apparatus is so used, it is desirable that the welding current be maintained at precisely selected magnitudes. Small variations in the current produced, for example, by aging of the components of the control apparatus or by variations in the supply voltage, can result in defective welds entirely unacceptable for aircraft or related use. It has been the practice in accordance with the teachings of the prior art to improve the precision with which the welding current is maintained by including regulating means in the control apparatus of the welding system, but this has not proved satisfactory.

It is, accordingly, an object of our invention to provide an electric resistance welding system of the type just described in the operation of which the welding current shall be maintained constant within narrow limits.

More broadly it is an object of our invention to provide apparatus for supplying a load that draws power intermittently during predetermined time intervals in the operation of which the magnitude of the load current during each interval shall be maintained constant within narrow limits.

Another object of our invention is to provide electric discharge apparatus particularly for controlling the supply of current to a high precision electric resistance welding system that draws current intermittently during predetermined time intervals in the use of which the magnitude of the current shall be maintained constant within predetermined narrow limits.

An incidental object of our invention is to provide a novel balanced network.

Another incidental object of our invention is to provide a novel gating circuit particularly suitable for inclusion in electric discharge apparatus for controlling the supply of current to a high precision welding system.

A further incidental object of our invention is to provide a novel electronic circuit.

Our invention arises from the realization that the principal difficulty encountered with prior art apparatus is caused by the intermittent character of the welding current. To maintain the welding current at the desired constant level, it is necessary that the electric discharge apparatus be provided with regulating means which includes a circuit for deriving from the welding load a signal dependent on the magnitude of the welding current and a compensating means to compensate for variations in the current as such variations are manifested in the signal. In working with prior art apparatus, we have found that the regulating means has a tendency to respond to the turning on of the welding current to produce transient variations which are of higher magnitude than the variations to be compensated; these transients preclude any effective regulation. In addition, we have found that in situations in which a series of welding pulses are transmitted at short intervals, the regulation in prior art apparatus is ineffective because the components of the prior art apparatus which transmit the compensating signal tend to lose, or so to speak forget, in what state the apparatus was left at the end of each welding pulse and, thus, must be reset for each new pulse. This resetting consumes so large a portion of the welding pulse that the regulation is ineffective.

In accordance with the specific aspects of our invention, we provide welding apparatus in which the power for welding is as is customary supplied during intermittent intervals and which includes regulating apparatus that is effective only after the welding current has become stabilized during each interval. Specifically, a potential dependent in magnitude on the welding current is compared with a reference potential by means of a novel balanced network across the input terminals of which the difference between the welding current dependent potential and the reference potential is impressed. The resulting signal derived from the output terminals of the network is impressed on a compensating circuit which cooperates with the welding circuit to change the welding current in accordance with the output of the balanced network. The signal from the balanced network is not, however, impressed continuously. During the stand-by condition of the apparatus, the compensating signal is entirely blocked, at the start of a welding impulse the magnitude of the signal is gradually increased from the stand-by zero magnitude to a magnitude dependent on the welding current. The increase is so related to the welding pulse that when the compensating signal has reached its maximum magnitude, the welding pulse has stabilized. Thus, the regulating apparatus is prevented from producing a transient in the welding current at the beginning of the welding pulse. At the end of a welding pulse, the compensating signal is substantially instantaneously blocked. Variations in the correcting signal during pause intervals between welds during a seam weld or an interrupted spot weld are thus avoided.

While the above generally described apparatus constitutes the important feature of our invention, there are other ancillary features. These include, among other items, a novel balanced network having high stability and in which the use of biasing components is minimized, and a novel electronic circuit which supplies potential during stand-by and pause intervals and includes an electric discharge device connected to conduct only during operating intervals.

Figure 2:
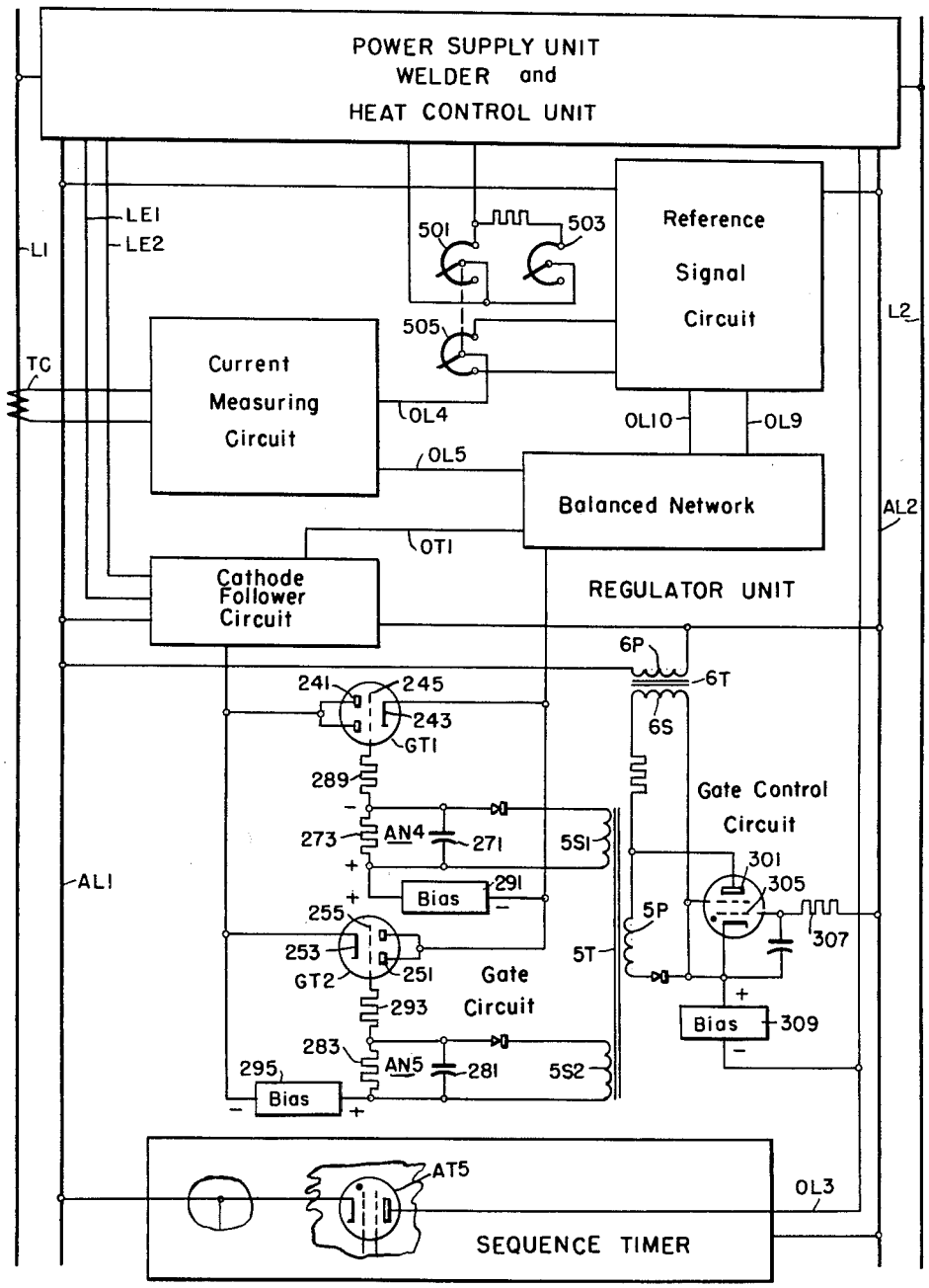

The novel features that we consider characteristic of our invention are discussed generally above. The invention itself both as to its organization and method of operation, together with additional objects and advantages thereof, will be understood from the following description of a specific embodiment when read in connection with the accompanying drawings, in which:

Figures 1A, 1B, 1C, 1D, and 1E together constitute a circuit diagram of a preferred embodiment of our invention; and Fig. 2 is a block diagram showing a modification of our invention.

*Description—Fig. 1*

The apparatus shown in the drawings is a welding system including a Welder, a Power Supply Unit, a Heat Control Unit, a Regulator Unit, a Program Control Unit, and a Sequence Timer. This apparatus is supplied from conductors L1 and L2 which derive their power from the usual commercial alternating current buses of 220, 440 or other voltages. For any lower voltages that may be desirable, for example, for the components of the Regulator Unit, the Program Control Unit, or the Sequence Timer, additional buses or conductors AL1 and AL2 are provided. These conductors AL1 and AL2 may derive their power from conductors L1 and L2 through a transformer (not shown).

The Welder includes a welding transformer T having a primary P and a secondary S. Welding electrodes E1 and E2 are connected across the secondary S, and in the use of the apparatus engage the work W. The Welder also includes the usual facilities (not shown) for actuating the electrodes E1 and E2.

The Power Supply Unit includes a pair of ignitrons I–1 and I–2, each ignitron having an anode 11, a cathode 13, and an igniter 15. The anodes 11 and cathodes 13 are connected in anti-parallel in series with the primary P between the conductors L1 and L2, and when the ignitrons I–1 and I–2 are rendered conducting, alternating current is supplied through them to the primary P. With each of the ignitrons I–1 and I–2, a firing thyratron, FT1 and FT2, respectively is associated. Each of the thyratrons FT1 and FT2 has an anode 21, a cathode 23, and a control electrode 25. The anodes 21 of the thyratrons FT1 and FT2 are each adapted to be connected to the anode of the associated ignitron I–1 or I–2 through the contacts 27 and 29 of a weld, no-weld relay RWN, which is actuated when a switch SWN is closed, connecting the coil of the relay between the conductors AL1 and AL2. The cathodes 23 of the thyratrons FT1 and FT2 are connected each to an igniter 15 of an associated ignitron I–1 or I–2. Each of the thyratrons FT1 and FT2 is controlled by a circuit interconnecting its control electrode 25 and cathode 23 and including a grid resistor 31 and 33, a blocking bias 37 and 35, and a resistor 41 and 39 across which a potential counteracting the bias is supplied from the secondaries FS1 and FS2 of a firing transformer FT. The primary FP of transformer FT is energized from the Heat Control Unit.

The Heat Control Unit includes a plurality of thyratrons HCT1, HCT2, and HCT3. Each of the thyratrons has an anode 51, a cathode 53, and a control electrode 55. The Heat Control Unit is energized from a transformer 1T having a primary 1P connected between the conductors AL1 and AL2 and a plurality of secondaries 1S1, 2S1, and 3S1. The secondaries 1S1 and 2S1 each having an intermediate tap 57 and 59. The anodes 51 of thyratrons HCT1 and HCT2 are connected each to a terminal of the secondary 1S1. The cathodes 53 are connected together to the anode 51 of thyratron HCT3. The circuit is completed from the cathode 53 of thyratron HCT3 through the primary FP, a current limiting resistor 61 to the intermediate tap 57 of the secondary 1S1. The secondary 2S1 supplies a phase shift network.

This network includes a resistor 63 and a fixed capacitor 65 and, in addition, a plurality of pairs of variable resistors 67 and 69, 71 and 73, and 75 and 77 for balancing, as they are labelled, the phase shift network respectively during the pre-heat, weld, and post-heat components of a welding interval. One resistor 67, 71, 75 of each pair is connected to the resistors 69, 73, 77 of the other pairs through a common fixed resistor 79. One each of these variable resistors 67, 71, 75 is ganged with a corresponding variable resistor 87, 91, 95 in the Regulator Unit which sets the reference signal for pre-heat weld and post-heat weld components respectively.

The capacitor 65, the fixed resistor 63, and the pre-heat balance variable resistor 67, 69 are connected in series across the secondary 2S1 through a normally closed contact 97 of a relay RE1 in the Program Control Unit. The pre-heat balance resistors 67, 69 may be replaced in this series circuit by weld balance resistors 71, 73, the latter are adapted to be connected in a series circuit, with the capacitor 65, the fixed resistor 63 and the secondary 2S1 through a normally closed contact 99 of a relay RE2 in the Program Control Unit and a normally open contact 101 of relay RE1. The post-heat balance resistors 75, 77 may also be connected in this circuit in place of the pre-heat balance or weld balance resistors 69, 71 or 73, 75 through normally open contacts 101 and 103 of relays RE1 and RE2, respectively. It is seen that for a sequence of operations in which relays RE1 and RE2 are initially deenergized, relay RE1 alone is energized first and thereafter relay RE2 is energized, the pre-heat balance, weld balance, and post-heat balance resistors will be connected in succession in the phase shift network.

A potential displaced in phase in dependence upon the magnitude and setting of the phase shift network resistors 63 and 67 through 77, with reference to the potential between the conductors AL1 and AL2, is derivable from the phase shift network. This potential is available between the junction 105 of the capacitor 65 and the resistors 67 through 77 and the intermediate tap 59. This potential is impressed across a pair of resistors 107 and 109 of equal magnitude connected between junctions 59 and 105. One of the output conductors LE1 from the Regulator Unit through which the compensating potential is supplied is connected to the junction of the resistors 107 and 109, and the other conductor LE2 is connected to the common junction of the cathodes 53 of thyratrons HCT1 and HCT2. The junction 59 is connected through a grid resistor 111 to the control electrode 55 of thyratron HCT1, and the junction 105 is connected through another grid resistor 113 to the control electrode 55 of thyratron HCT2.

Opposite phase potentials displaced in phase with reference to the potential between conductors L1 and L2 by angles dependent on the settings of the phase shift network are thus impressed through the resistors 111 and 113 between the control electrodes 55 and the cathodes 53 respectively of the thyratrons HCT1 and HCT2. To these potentials the potential which appears between the conductors LE1 and LE2 is added. The net potential impressed between the control electrodes 55 and the cathodes 53 of the thyratrons HCT1 and HCT2 is thus an alternating current ripple derived from the phase shift network which is superimposed on a direct current potential from conductors LE1 and LE2 and the instants in the periods of the potential derivable from the conductors L1 and L2 when the thyratrons HCT1 and HCT2 are fired is determined by this net potential.

The third secondary 3S1 supplies a blocking potential in the control circuit of thryatron HCT3. This potential is impressed across a bias network B1 consisting of a capacitor 121 shunted by a resistor 123 through a rectifier. The blocking bias B1 may be counteracted by potential supplied across a network AN1 consisting of a capacitor 131 shunted by a resistor 133. The networks B1 and AN1 are connected in series between the control electrode 55 and the cathode 53 of a thyratron HCT3 through a grid resistor 135. The counteracting potential may be impressed on the network AN1 from an output conductor OL3 of the Sequence Timer through a resistor 137.

Since the thyratron HCT3 is in series with the thyratrons HCT1 and HCT2, the latter are incapable of conducting unless thyratron HCT3 conducts. Thyratron HCT3 can conduct only when counteracting potential is supplied through the conductor OL3. Once this thyratron conducts, it permits the others HCT1 and HCT2 to conduct at instants predetermined by the potential derivable from the conductors LE1 and LE2 and the setting of the phase shift network. Preferably the network is set to render thryatrons HCT1 and HCT2 conducting at instants displaced from the new instant of the corresponding half periods by about quarter periods in the absence of potential on conductors LE1 and LE2. A resistor 139 is connected in parallel with the anode 51 and cathode 53 of thyratron HCT2. This resistor balances the anode voltages impressed on thyratrons HCT1 and HCT2.

The character and magnitudes of the components of the Heat Control Unit are known to those skilled in the art. But, it appears desirable to mention that the ganged variable resistor 67, 71, 75 of each pair of the phase shift network has a maximum resistance of 10,000 ohms; the other resistor 69, 73, 77 a maximum resistance of 25,000 ohms, and the resistor 79 connecting the ganged resistors to the others has a resistance of 6,800 ohms.

The Regulator Unit includes as labelled a current measuring circuit, a reference signal circuit, a balanced network, a cathode follower circuit, a gate circuit, a gate control circuit, and a relay circuit. The current measuring circuit includes a current transformer coil TC coupled to the conductor L1. When the primary P of the Welder is being supplied and current flows through conductor L1, a potential appears across the coil TC. This potential is impressed across the primary 2P of a transformer 2T which is shunted by a variable resistor 141. The potential derivable from the secondary 2S of this transformer is rectified by a full-wave rectifier RX1, the rectified potential appearing across a filter capacitor 151 which is shunted by a filter resistor 153. The current measuring circuit may be regarded as having output conductors OL4 and OL5 at the plates of the capacitor.

The reference signal circuit includes a transformer 3T, the primary 3P of which is supplied from the the conductors AL1 and AL2. The potential across the secondary 3S is rectified by a full-wave rectifier RX2 and appears across a filter capacitor 161. A regulator tube RT is connected across the capacitor 161 through a resistor 163 so that the potential derivable from the capacitor is thus of substantially constant magnitude. The variable resistors 87, 91, 95 which are ganged with corresponding resistors 61, 71, 75 in the phase shift network are connected in parallel with the regulator tube RT through a fixed resistor 165. Potentials depending on the setting of these variable resistors are derivable from output conductors OL6, OL7, and OL8, respectively connected to the adjustable arms of the variable resistors 87, 91, 95. The conductor OL6 which is connected to the pre-heat variable resistor 87 is connected through a normally closed contact 167 of the relay REL to the conductor OL4. The conductor OL7 is adapted to be connected to the conductor OL4 through a normally open contact 169 of the relay RE1 and a normally closed contact 171 of the relay RE2. The conductor OL8 connected to the post-heat resistor 75 is adapted to be connected to the conductor OL4 through normally open contacts 171 and 173 of the relays RE1 and RE2. Thus, if the Program Control Unit operates as described above, reference potentials depending on the settings of the pre-heat, weld and post-heat resistors 87, 91, 95 will be impressed in sequence on the conductor OL4. These potentials may be regarded derivable from the positive terminal of the reference signal circuit. The negative terminal of the reference signal circuit is connected to another output conductor OL9.

The balanced network includes a double triode BT having a pair of anodes 161, 172, a pair of cathodes 163, 178, and a pair of control electrodes 165, 175. This network also includes a plurality of resistors 177, 179, 181 and a variable resistor 183. The resistors 177, 179, 181, the anodes 161 and 172, and the cathodes 163, 178 are connected in a blanced network having input terminals IN1 and IN2 and output terminals OT1 and OT2. In this network, the anodes 161 and 172 are connected respectively to the terminals OT1 and OT2. Two of the resistors 177 and 179 are connected between the terminals OT1 and OT2 through the variable resistor 183. The adjustable tap of the variable resistor is at the input terminal IN1. The input terminal IN2 is connected to the common junction of the cathodes 163 and 178 through the other resistor 181. The control electrode 175 is also connected to the terminal IN2. Potential is supplied at the input terminals IN1 and IN2 from conductors OL9 and OL10 connected to the capacitor 161 of the reference signal circuit. The conductor OL5 is connected to the control electrode 165 of one of the sections of the double triode BT through a grid resistor 185. The return connection is through the resistor 181 connected to the cathodes 163 and 173 and the input terminal IN2 to the conductor OL9. A potential equal to the difference of the potentials appearing across the outputs OL4 and OL5 and OL9 and OL10 of the current measuring circuit and the reference signal circuit is thus impressed between the control electrode 165 and the cathode 163 of one section 161—163 of the double triode BT. This potential tends to produce a variation in the current flow between the anode 161 and the cathode 163, and therefore a variation in the potential of the current flow through the resistor 181 between the cathodes 163, 178 and the input terminal IN2. This potential appears as a control potential on the other section 171, 173 of the triode BT, which is of opposite sense to the control potential impressed on the first section 161, 163. Thus, a small variation in the control potential of the first section 161, 163 produces not only a variation in the current flow between the anode 161 and the cathode 163 of this section, but also a corresponding change of opposite polarity in the current flow between the anode 171 and the cathode 173 of the other section. These changes produce a corresponding change in the potential between the output terminals OT1 and OT2. Since the effect of a potential impressed on the control section 161, 163 of the double triode BT is thus multiplied by its effect on the other section, 172, 173, the balanced network is highly sensitive. In addition, we have found that this network is highly stable.

The balanced network is initially balanced by the variable resistor 183. To effect the balancing, a pair of ganged push buttons BP1 and BP2 is provided. One, BP1, connects the control electrode 165 of the controlled section 161, 163 of the double triode BT to the input terminal IN2 through the grid resistor 185; the other, BP2, connects the output terminal OT2 to the network AN3. To facilitate the balancing, a milliammeter MA is connected across the networks AN2 and AN3 through a pair of resistors 174 and 176 and a switch SW1 which is closed during the balancing operation.

The cathode follower circuit includes a double triode CT having a pair of anodes 191, 201, a pair of cathodes 193, 203, and a pair of control electrodes 195, 205. The cathode follower circuit is supplied from a transformer 4T, the primary 4P of which is connected to the conductors AL1 and AL2 and the secondary 4S of which is of the type having an intermediate tap and supplies a rectifier RX3 having a filter consisting of a capacitor 211 shunted by a pair of resistors 213 and 215. The anodes 191 and 201 are connected together to the positive terminal of the rectifier RX3. The cathodes 193, 203 are connected each through an output resistor 217, 219 to the negative terminal of the rectifier RX3.

The conductor LE2 is connected to the junction between the cathode 193 and the resistor 217 through the contact 220 of a switch SRN which may be set to disconnect the Regulator Unit from the Heat Control Unit. The conductor LE1 is connected to the junction of the cathode 203 and the resistor 219. To control the sections of the double triode CT, a pair of networks AN2 and AN3, each consisting of a capacitor 221, 231 shunted by a resistor 223, 233, are provided. The capacitors 221 and 231 and resistors 223, 233 of the networks are of substantially the same magnitude. The networks AN2 and AN3 are connected in series between the control electrodes 195 and 205. The junction of the networks is connected to the junction of the resistors 213 and 215 across the rectifier RX3. The capacitors 221, 231 and resistors 223, 233 of the networks AN2 and AN3 are so related that the time constants of these networks are long enough to retain the charge impressed on them during cool intervals between weld intervals in seam welding or interrupted spot welding, but sufficiently short to permit substantially complete discharge of the networks AN2 and AN3 during the hold, off and squeeze intervals timed in ordinary spot welding.

The gate circuit includes a pair of electric discharge devices GT1 and GT2 of the continuous control type. Specifically, these discharge devices may be ordinary high vacuum tubes, as distinct from thyratrons. In operation, such vacuum tubes have the property of varying their anode-cathode current continuously as the control potential is varied. Thus, as the control potential on discharge devices GT1 and GT2 is decreased from a high negative magnitude to zero, the current flow through these discharge devices increases continuously.

Each of the discharge devices GT1 and GT2 has an anode 241, 251, a cathode 243, 253, and a control electrode 245, 255. The anodes 241, 251 and cathodes 243, 253 are connected in inverse or anti-parallel between a conductor OL11 connected to output terminal OT2 and a conductor OL12 connected to the network AN3. The output terminal OT1 is connected through a variable resistor 261 and a fixed resistor 263 to the network AN2 and, thus, the potential which appears between the conductors OT1 and OT2 is impressed across the networks AN2 and AN3 when the discharge devices GT1 and GT2 are conducting. The networks AN2 and AN3 are then charged at a rate depending upon the conduction of discharge devices GT1 and GT2 and to a potential depending upon the potential between the output terminals OT1 and OT2.

The discharge devices GT1 and GT2 are controlled from a pair of networks AN4 and AN5, each consisting of a capacitor 271, 281 shunted by a resistor 273, 283. These networks are supplied with potential respectively from secondaries 5S1 and 5S2 of a transformer 5T of the gate control circuit through rectifiers 285 and 287 respectively.

The network AN4 is connected between the control electrode 245 and the cathode 243 of the discharge device GT1 through a grid resistor 289 and a bias 291. The network AN5 is connected between the control electrode 255 and a cathode 253 of discharge device GT2 through a grid resistor 293 and a bias 295. The secondaries 5S1 and 5S2, respectively and the rectifiers 285 and 287 are so poled that the networks AN4 and AN5 have a potential impressed on them tending to block conduction of the discharge devices GT1 and GT2 when current is conducted through the primary 5P. The biases 291 and 295 are of such polarity as to tend to counteract this blocking effect, but so long as the primary 5P is supplied with potential, the biasing potentials are inadequate to maintain the discharge devices GT1 and GT2 appreciably conducting.

In the gate control circuit the primary 5P of transformer 5T is supplied from another transformer 6T having a primary 6P connected between conductors AL1 and AL2 and a pair of secondaries 6S1 and 6S2. The primary 5P is connected across the secondary 6S1 through a rectifier 297 and a resistor 299, and current flows through the primary 5P during alternate half periods of the potential supplied by conductors AL1 and AL2. The primary 5P is also shunted by a thyratron GT3 having an anode 301, a cathode 303, and a control electrode 305. The anode 301 of this thyratron is connected to the junction of the primary 5P and the resistor 299. The cathode 303 is connected to the negative pole of the rectifier 297. The control electrode is connected through a grid resistor 307 to the conductor AL2. The cathode is connected through a blocking bias 309 to the conductor OL3. Since the conductor OL3 is connected to the conductor AL2, the discharge device GT3 is normally maintained non-conducting. Thus, primary 5P carries current and blocking potential, is induced in the networks AN4 and AN5 to maintain discharge devices GT1 and GT2 non-conducting.

The relay circuit includes a thyratron RET having an anode 321, a cathode 323, and a control electrode 325. The anode 321 of this thyratron is connected to the conductor AL1 through the coil of a relay RE3. The cathode 323 is connected to the conductor AL2. The relay RE3 has a contact 327 which short-circuits the networks AN2 and AN3. The coil of the relay RE3 is shunted by a rectifier 329 in series with a resistor 331 to prevent the relay from chattering.

Potential for thyratron RET is provided by the secondary 6S2 of the transformer 6T. This secondary is connected through a rectifier 333 across a network B2 including a capacitor 341 shunted by a plurality of resistors 343, 345, 347. The rectifier 333 is so poled that the network B2 is charged to a polarity tending to block conduction of thyratron RET. The secondary 6S2 and the rectifier are also connected to charge a pair of capacitors 351 and 361, respectively, through normally closed contacts 367 and 369 of relays RE1 and RE2. The capacitors 351 and 361 are adapted to be connected each across a discharge resistor 353 and 363 through normally open contacts 371 and 373 of relays RE1 and RE2, respectively. The control electrode 325 is connected to the cathode 323 through a grid resistor 364, resistor 363 and network B2.

The relay circuit is provided for the purpose of resetting the networks AN2 and AN3 during short intervals of the order of one and one-half period between the pre-heat and the weld components and between the weld and the post-heat components of the welding pulse. During these intervals, the contact 327 is closed and discharges the networks AN2 and AN3.

For the purpose of aiding those skilled in the art in practicing our invention, the components of the Regulator Unit which we have found to operate satisfactorily are listed below. It is understood that both the character and the magnitudes of these components may be varied over a wide range by those familiar with the art. The listing of the components then is not to be considered in any way as limiting the scope of our invention.

Current measuring circuit

| | |
|---|---|
| Current transformer coil TC | Desired output current about 5 amperes. |
| Transformer 2T | 5 volts across primary produces 220 volts across end terminals of secondary. Primary no load impedance greater than 20 ohms. |
| Primary 2P | 5 to 220 v. CT 10 v.a. |
| Secondary 2S | Primary NL impedance 20. |
| Variable resistor 141 across primary 2P | 2 ohms. |
| Filter resistor 153 | 1.5 megohms. |
| Filter capacitor 151 | .25 microfarad. |

Reference signal circuit

| | |
|---|---|
| Secondary 3S | 250 volts R.M.S. between intermediate tap and terminals. |
| Rectifier tube RX2 | 6X5. |
| Filter capacitor 161 | 4 microfarads. |
| Voltage regulator tube RT | VR150. |
| Pre-heat weld and post-heat variable resistors | Each 50,000 ohms. |
| Resistor 165 at negative terminal of filter capacitor | 12,000 ohms. |
| Resistor 163 at positive terminal of filter capacitor | 5,000 ohms. |

Balanced network

| | |
|---|---|
| Discharge device BT | 6SN7. |
| Resistors 177, 179 in arms of network | Each 68,000 ohms. |
| Initial balance resistor 183 | Maximum resistance 50,000 ohms. |
| Resistor 181 between cathodes and terminal IN2 | 1,500 ohms. |
| Grid resistor 185 controlled section | .47 megohm. |
| Variable resistor 261 connected to OT1 | .5 megohm. |
| Fixed resistor 263 connected to variable resistor | .22 megohm. |
| Indicator | A microammeter. |
| Resistor 174 in series with indicator | 2.2 megohms. |

Cathode follower circuit

| | |
|---|---|
| Discharge device Ct | 6SN7. |
| Secondary 4S, potential between intermediate tap and terminals | 200 volts. |
| Filter capacitor 211 | 2 microfarads. |
| First filter resistor 215 | 47,000 ohms. |
| Second filter resistor 213 | 10,000 ohms. |
| Output resistors 217, 219 | Each 33,000 ohms. |
| Networks AN2 and AN3 each— | |
| Capacitors—221, 231 | 2 microfarads. |
| Resistors—223, 233 | .5 megohm. |
| Short-circuiting resistor 176 | 100 ohms. |

Gate circuit

| | |
|---|---|
| Tubes GT1 and GT2 each | 6SN7. |
| Secondaries 5S1 and 5S2 potential | Each 55 volts. |
| Networks AN4 and AN5 each— | |
| Capacitors—271, 281 | .1 microfarad. |
| Resistors—273, 283 | .22 megohm. |
| Bias 291, 295 | Each about 15 volts. |
| Grid resistors 289, 293 | Each .1 megohm. |

Gate control circuit

| | |
|---|---|
| Thyratron GT3 | WL2050. |
| Anode resistor 299 | 470 ohms. |
| Grid resistor 307 | .1 megohm. |
| Bias 309 | About 25 volts. |

Relay circuit

| | |
|---|---|
| Thyratron RET | WL2050. |
| Network B2— | |
| Capacitor 341 | 1 microfarad. |
| First resistor 343 | 47,000 ohms. |
| Second resistor 345 | 47,000 ohms. |
| Third resistor 347 | 100 ohms. |
| First capacitor 351 | .5 microfarad. |
| Discharge resistor for first capacitor 353 | 33,000 ohms. |
| Second capacitor 361 | 1 microfarad. |
| Discharge resistor for second capacitor 363 | 100 ohms. |
| Grid resistor 364 | .1 megohm. |
| Resistor across relay 331 | 680 ohms. |

The Program Control Unit includes in addition to the relays RE1 and RE2 a plurality of main thyratrons PCT1 and PCT2 and auxiliary thyratrons AT1, AT2, and AT3. The Program Control Unit also includes a pair of time-constant networks PCN1 and PCN2 and an auxiliary network AN6.

Thyratron PCT1 has an anode 401, a cathode 403, and a control electrode 405. Network PCN1 includes a capacitor 411 shunted by a variable resistor 413. The capacitor 411 and the resistor 413 are so related that the network may be set to time pre-heat intervals. The anode 401 of thyratron PCT1 is connected to conductor AL2 through the exciting coil of relay RE1. The cathode 403 is connected to conductor AL1. The network PCN1 is connected between the control electrode 405 and the cathode 403 of thyratron PCT1 through a grid resistor 417 and a positive bias 418.

Thyratron PCT2 has an anode 421, a cathode 423, and a control electrode 425. Network PCN2 has a capacitor 431 shunted by a variable resistor 433. This network may be set to time the post-heat component of the welding pulse. The anode 421 of thyratron PCT2 is connected to conductor AL2 through the exciting coil of relay RE2; the cathode 423 is connected to conductor AL1. The control electrode 425 is connected to the cathode 423 through network PCN2 and a grid resistor 437.

Thyratron AT1 has an anode 441, a cathode 443, and a control electrode 445. The anode 441 of thyratron AT1 is connected to conductor AL1 through a resistor 446 in network PCN1. The cathode 443 is connected to conductor AL2. The control electrode 445 is connected through a grid resistor 447 to conductor OL3 which is, in turn, connected through the resistor 137 to conductor AL2.

Thyratron AT2 has an anode 451, a cathode 453, and a control electrode 455. Network AN6 has a capacitor 461 shunted by a resistor 463. This network has a time constant such that when charged and permitted to discharge, it times out in a time interval of the order of the period of the supply. The anode 451 of thyratron AT2 is connected through the network AN6 to the conductor AL2; the cathode 453 is connected to the conductor AL1. The control electrode 455 is connected to the cathode 453 through the grid resistor 417 and the network PCN1.

Thyratron AT3 has an anode 471, a cathode 473, and a control electrode 475. The anode 471 of this thyratron is connected to conductor AL1 through the network PCN2. The cathode 473 is connected to conductor AL2. The control electrode 475 is connected to the cathode through the network AN6.

The Sequence Timer shown in Fig. 1E is of the general type shown in application Serial No. 272,818, filed February 21, 1952, to Clarence B. Stadum, Hubert W. Van Ness and Edward C. Hartwig, but may be of any type known in the art. Specifically, it may be of the type disclosed in application Serial No. 424,094, filed April 19, 1954, to Hubert W. Van Ness and Patent 2,832,033, granted April 22, 1958, to Hubert W. Van Ness, both assigned to Westinghouse Electric Corporation. Such a Sequence Timer includes a discharge device which is designated in Figure 1E as AT4, but which may be the discharge device ST of application Serial No. 424,094, or the discharge device AT of Patent 2,832,033. This discharge device AT4 has an anode 481, a cathode 483, a first control electrode 485 and a second control electrode 487, and its conductivity is timed in such a manner that it conducts during the whole weld interval which may include a pre-heat component, a weld component, and a post-heat component. Where the apparatus includes interrupted or impulse welding facilities, the discharge device AT4 is rendered conducting and non-conducting repeatedly during each of the pre-heat, weld and post-heat components of the welding pulse. In situations in which the welding is of the interrupted spot type, as for example the one shown in Patent 2,832,033, the thyratron AT4 is rendered conducting and non-conducting repeatedly during each weld. The specific control circuit for rendering thyratron AT4 conducting and non-conducting is not shown in detail.

The anode 481 of the thyratron AT4 is connected to conductor OL3; the cathode 483 is connected to conductor AL1. When thyratron AT4 conducts, current flows through the resistor 137 in series with conductor OL3. It is seen that this current is of such polarity as to charge network AN1 to a potential such as to counteract the blocking bias B1. The current flow through thyratron AT4 also tends to maintain thyratron AT1 non-conducting and thyratron GT3 conducting.

*Stand-by*

In the stand-by condition of the apparatus, the conductors L1 and L2 and AL1 and AL2 are energized and supply potential. Switch SWN is closed and relay RWN is energized so that the anodes of thyratrons FT1 and FT2, respectively, are connected to the anodes of the associated ignitrons I-1 and I-2. The thyratron AT4 in the Sequence Timer is non-conducting so that the conductor OL3 does not carry current and is at the potential of conductor AL2. Network AN1 is then uncharged and thyratron HCT3 is non-conducting. Primary FT is then deenergized as are thyratrons FT1 and FT2, and ignitrons I-1 and I-2 are non-conducting. Since ignitrons I-1 and I-2 are non-conducting, there is no current flow through conductor L1 and the capacitor in the output of the current measuring circuit is uncharged so that there is no potential between the conductors OL4 and OL5. Transformer 3T is energized and there is potential across the capacitor of the reference signal circuit. There is then a potential between the output terminals OT1 and OT2 of the balanced network. But, this potential is not impressed on the networks AN2 and AN3 of the cathode follower circuit because thyratron GT3 is non-conducting, and networks AN4 and AN5 are charged so that discharge devices GT1 and GT2 are non-conducting.

Since thyratron AT4 is non-conducting, thyratron AT1 is conducting and network PCN1 is charged. The blocking potential on PCN1 counteracts the bias 418 and thyratrons PCT1 and AT2 are then non-conducting and network AN6 is uncharged. Thyratron AT3 is then conducting and network PCN2 is charged so that thyratron PCT2 is non-conducting. Relays RE1 and RE2 are deenergized and the pre-heat variable resistors are connected, respectively, in the phase shift network and to the conductor OL4, as shown in the drawings.

Since relays RE1 and RE2 are deenergized, thyratron RET of the relay circuit is maintained non-conducting by blocking bias B2. In addition, the other capacitors in this control circuit are charged with their plates connected to the rectifier positive relative to the other plates. Since thyratron RET is non-conducting, relay RE3 is deenergized and the short-circuit across networks AN2 and AN3 is open.

Before the apparatus is set for an operation, the variable tap on the balance resistor 183 is adjusted with the aid of the zero set buttons BP1 and BP2, so that the balanced network is balanced. Because of the operation of the zero set buttons during the balancing, the network is set so that if the potential output of the current measuring circuit is equal to the potential output of the reference signal circuit, the network is in balance.

*Operation*

To produce a weld with the apparatus, the work W is inserted between the electrodes E1 and E2 and a start switch (not shown) usually mounted in the Sequence Timer or connected to the Sequence Timer is closed. Following the operation of this start switch, the electrodes E1 and E2 are engaged with the work W under pressure, and the work is now set for a welding operation.

The closing of the start switch starts the sequencing of the Sequence Timer and eventually thyratron AT4 is rendered conducting and current flows through the conductor OL3 and the resistor 173 in series. This has several effects.

One effect is that network AN1 is charged and the biasing potential impressed by the network B1 is counteracted. Thyratron HCT3 now conducts during alternate half periods through the resistor 139 across the anode 51 and cathode 53 of thyratron HCT2. Initially, this conduction is not such as to cause thyratron FT1 to be rendered conducting. But, at the instant predetermined by the setting of the phase shift network, thyratron HCT2 is rendered conducting and thereafter during the half period, current flows through thyratrons HCT2 and HCT3 and the primary FP. This current is sufficient to cause thyratron FT1 to conduct, and ignitron I-1 is rendered conducting so that current flows through the primary P from right to left. During the succeeding half period, thyratron HCT1 is rendered conducting at a predetermined instant in the half period as set by the phase shift network, and again current flows through primary FP. This time, thyratron FT2 and ignitron I-2 are rendered conducting, and current flows through primary P2 left to right. Since the apparatus is set for pre-heat, the thyratrons HCT2, HCT1, and HCT3 are rendered conducting late in the half periods of the supply, and the current flow is of low magnitude.

The flow of this current through the conductor L1 induces potential in the current measuring circuit and the potential is impressed between the conductors OL4 and OL5 to change the balance of the balanced network. Potential then appears between the terminals OT1 and OT2, but initially this potential has no effect since initially discharge devices GT1 and GT2 are non-conducting.

But a second effect of the conduction of thyratron AT4 is that thyratron GT3 is rendered conducting and shunts out primary 5P. The potential supplied by the secondary 5S1 and secondary 5S2 in the gate circuit is now substantially reduced and networks AN4 and AN5 discharge. The discharge of these networks gradually increases the conduction of discharge devices GT1 and GT2, and this increase in conduction increases the potential impressed from the balanced networks AN2 and AN3. As this potential gradually increases, the potential supplied across the output resistors 217 and 219 of the cathode follower circuit is gradually unbalanced so that potential appears between the conductors LE1 and LE2, and the instant when the thyratrons HCT1 and HCT2 are fired is set in accordance with the output of the cathode follower circuit. Since the cathode follower circuit is of low impedance, the connection of the conductors LE1 and LE2 into the control circuits of thyratrons HCT1 and HCT2 does not have a disturbing effect.

The networks AN4 and AN5 have a time constant such that the maximum potential from the balanced network is impressed on networks AN2 and AN3 in a time interval of the order of a period and a half of the supply. The pre-heat current and the current measuring circuit thus have time to stabilize, and the regulating effect introduced by the cathode follower circuit is not such as to produce undesired transients.

If the Sequence Timer is capable of producing interrupted operation, the conduction of thyratron AT4 is now interrupted for a time interval of the order of a period or two. The effect of this interruption is to render thyratron HCT3 non-conducting and for a short time stop the flow of pre-heat current. In addition, thyratron GT3 is rendered non-conducting and current flows through transformer 55 to charge networks AN4 and AN5. The networks are charged abruptly so that the conduction of devices GT1 and GT2 is interrupted abruptly. This has the effect of preserving the charge on networks AN2 and AN3. The networks can thus remember the signal which they last received from the balanced network.

After the short interval of non-conduction, thyratron AT4 is again rendered conducting and the above-described operation is repeated. But this time the slow rise in conduction of discharge devices GT1 and GT2 has a negligible effect on the cathode follow circuit; its compensation effect continues as when the interruption occurred since networks AN2 and AN3 are charged. For the present the flow of pre-heat current then continues at intervals.

A third effect of the conduction of thyratron AT4 is to render thyratron AT1 non-conducting. While the above-described operation is progressing, then network PCN1 is discharging. This discharge continues in spite of the interrupted character of the non-conduction of thyratron AT1 because interruptions are short. The network PCN1 then discharges in a time interval equal to the desired pre-heat interval, and when it times out, thyratrons PCT1 and AT2 are rendered conducting. The conduction of thyratron PCT1 actuates relay RE1 and the conduction of thyratron AT2 charges network AN6, rendering thyratron AT3 non-conducting and starting the timing out of network PCN2.

The actuation of relay RE1 opens the connection between the pre-heat balancing resistors 67 and 69 and the remainder of the phase shift network and makes the connection between the weld balancing resistors 71 and 73 and the remainder of the phase shift network, so that the phase shift network is now set for weld. In addition, the actuation of relay RE1 disconnects the pre-heat variable resistor 91 from conductor OL4 and connects the weld resistor 95 so that the current measuring circuit and the reference signal circuit are now set for weld. Independently of the Regulator Unit, the current flow through the Welder now rises to the weld magnitude.

At the end of the pre-heat interval, the compensating effect produced by the cathode follower circuit is such as to tend to cause the pre-heat current to vary in one sense or the opposite. The effect of the setting of the phase shift network for weld may be to cause the compensating circuit to tend to produce compensation of the opposite polarity. The result would be a transient in the welding current. To avoid this condition, the networks AN2 and AN3 are reset at the end of the pre-heat interval. This object is accomplished by the closing of the normally open contact 371 and the opening of the normally closed contact 367 in the control circuit of the thyratron RET. The pre-heat-to-weld capacitor 351 which was charged from the secondary 6S2 is now connected between the control electrode 325 and the cathode 323 of the thyratron RET with its positive plate connected to the control electrode 325 and its negative plate to the cathode 323. Thyratron RET is then rendered conducting, actuating relay RE3. The normally open contact 327 of relay RE3 closes, discharging networks AN2 and AN3. This operation persists for only a short time interval which may be of the order of one and one-half periods, the capacitor 351 being discharged by the resistor 363 now connected in parallel with it and thyratron RET being again rendered non-conducting during this short interval. Relay RE3 is then deenergized, and the networks AN2 and AN3 now respond to the condition of the balanced network as changed by the resetting of the apparatus for weld. The networks AN2 and AN3 are not charged abruptly but in a relatively short time interval through the variable resistor 261 in series with the networks and with the terminals OT1 and OT2. The Regulator Unit is thus prevented from producing instability.

The operation now continues with the appratus set for weld and welding current flows through the work W. In this case again the thyratron AT4 may be repeatedly rendered conducting and non-conducting to produce an interrupted weld. The resistor 446 is of such magnitude that the resulting conduction of thyratron AT1 does not interrupt the program timing of the Program Control Unit.

Since thyratron AT2 is rendered conducting, blocking thyratron AT3, network PCN2 times out and at the end of a predetermined time interval, relay RE2 is actuated. Actuation of relay RE2 opens the normally closed contact 99 in series with the weld balance resistors 71 and 73 of the phase shift network and closes the normally open contact 103 in series with the post-heat balance resistors 75 and 77. The phase shift network is now set for post-heat. In addition, the normally closed contact 171 to conductor OL7 is opened, and the normally open contact 173 to conductor OL8 is closed. The post-heat variable resistor is then connected into the Regulator Unit and the weld resistor is disconnected from it. Further, the weld-to-post-heat capacitor 361 is connected between the control electrode 325 and the cathode 323 of thyratron RET with its positive plate connected to the control electrode and its negative plate to the cathode, and thyratron RET is again rendered conducting for a short time interval actuating relay RE3 and resetting the networks AN2 and AN3. Thyratron RET becomes non-conducting after this interval, and the networks AN2 and AN3 respond to the balanced networks OT1 and OT2 setting the cathode follower circuit to compensate for the post-heat current.

The post-heat current which may also be interrupted continues to flow until the end of the weld interval. This event is signalled in the Sequence Timer by the rendering and maintaining non-conducting of thyratron AT4. When thyratron AT4 is maintained non-conducting, the supply of current through conductor OL3 and the resistor in series with it is terminated. Network AN1 then discharges in a time interval of the order of one period of the supply, and thyratron HCT3 is finally rendered non-conducting stopping the flow of current through the primary FP of the transformer FT and the rendering conducting of the thyratrons FT1 and FT2 and the ignitrons I-1 and I-2. In addition, thyratron GT3 is rendered non-conducting. A short time interval after thyratron GT3 becomes non-conducting, current flows through primary 5P and networks AN4 and AN5 are charged. Discharge devices GT1 and GT2 are then substantially immediately rendered non-conducting to disconnect networks AN2 and AN3 from the balanced network. When so disconnected, networks AN2 and AN3 remain charged for a reasonable time interval, but this feature is of no importance in this phase of the operation.

The rendering non-conducting of thyratron AT4 permits thyratron AT1 to conduct. Network PCN1 is then charged rendering thyratrons PCT1 and AT2 non-conducting. When thyratron PCT1 becomes non-conducting, relay RE1 is deenergized dropping out. When thyratron AT2 becomes non-conducting, network AN6 is permitted to discharge and discharges in a time interval of the order of a period of the supply. Thyratron AT3 then becomes conducting charging network PCN2 and rendering thyratron PCT2 non-conducting. Relay RE2 drops out and the apparatus is now reset for another spot welding operation.

*Repeat pulse welding—Fig. 2*

Apparatus in accordance with our invention is also frequently used for what is here called repeat pulse welding. In such welding a number of discrete pulses are transmitted to produce each weld. For each group of pulses the phase shift network is set at only one setting; that is, there is only a weld component and no pre-heat or post-heat components. Such apparatus operates without a Program Control Unit and without the relay circuit. The Sequence Timer is of the type in which the thyratron corresponding to AT4 produces a number of pulses during each weld interval. Such operation is produced by the thyratron AT of the above-mentioned Patent 2,832,033. Apparatus of this type is shown in Fig. 2 in which the Power Supply Unit, the Welder, the current measuring circuit, the balanced network, the cathode follower circuit, the gate circuit and the gate control circuit are the same as for the Fig. 1 apparatus, and the Heat Control Unit differs from the corresponding Fig. 1 component in that it includes only weld balance variable resistors 501 and 503, the reference signal circuit includes only a weld resistor 505 and the Sequence Timer is of the proper type.

The operation of the apparatus shown in Fig. 2 is initiated by closing a start switch (not shown). The electrodes are then engaged with the work and eventually at the beginning of the first heat interval current is transmitted through the thyratron corresponding to thyratron AT5 of the Sequence Timer. The flow of this current charges the network AN1 (see Fig. 1A) permitting thyratrons HCT1, HCT2, and HCT3 to conduct at instants in the periods of the supply corresponding to the weld setting. Ignitrons I-1 and I-2 then correspondingly conduct. The conduction of the thyratron corresponding to AT5 also has the effect of rendering thyratron GT3 conducting to interrupt the charging of networks AN4 and AN5. The conduction of discharge devices GT1 and GT2 then gradually increases. The flow of current through the primary P also induces potential in the transformer 2T which, in turn, appears across the capacitor of the current measuring circuit. This potential is balanced against the potential of the reference signal circuit and a potential appears at the terminals OT1 and OT2 of the balanced network. This potential is impressed gradually across the networks AN2 and AN3 as the conductivity of the discharge devices GT1 and GT2 gradually increases.

The Regulator Unit becomes fully effective in an interval of the order of one and a half periods of the supply and maintains the current at the desired magnitude without producing transients. At the end of the first weld impulse, thyratron AT5 is rendered non-conducting during a cool interval. Network AN1 then discharges stopping the flow of welding current. The potential then disappears from the current measuring circuit, but the effect of this is minimized because thyratron GT3 is rendered non-conducting immediately charging networks AN4 and AN5 to render discharge devices GT1 and GT2 non-conducting, so that the networks AN2 and AN3 are disconnected from the terminals OT1 and OT2. The networks AN2 and AN3 then remain substantially unaffected by the changes in the Regulator Unit so long as the thyratron corresponding to AT4 remains non-conducting.

At the beginning of the second heat interval, thyratron AT4 is again rendered conducting, permitting ignitrons I-1 and I-2 to again conduct and thus causing the potential to again appear across the current measuring circuit. Thyratron GT3 is also rendered conducting permitting networks AN4 and AN5 to discharge to gradually increase the conduction of discharge devices GT1 and GT2. This change in the conduction of the discharge devices GT1 and GT2 does not have an important effect, since the networks AN2 and AN3 are charged and their regulating effect which these networks were producing at the end of the first heat pulse continues into the second. The above-described operation is now repeated.

*Conclusion*

It is seen that we have provided welding apparatus for high precision welding in which regulation is effected without producing transients. Our invention includes not only such apparatus but also a novel balancing circuit and a novel electronic circuit particularly suitable for use in such apparatus.

While we have shown and described a certain specific embodiment of our invention, many modifications thereof are possible. Our invention, therefore, is not to be restricted except insofar as is necessitated by the spirit of the prior art.

We claim as our invention:

1. A balanced network for balancing a first voltage against a second voltage comprising means for impressing said first voltage between first and second conductors, means for impressing a second voltage between third and fourth conductors, means connecting said conductors so that the difference between said voltages appears between said second and third conductors, a first input terminal, a second input terminal, a first output terminal, a second output terminal, means connecting said first conductor to said first input terminal, means connecting said second conductor to said second input terminal, first and second electric discharge paths each having an anode, a cathode, and a control electrode, a first impedance, a second impedance, a third impedance, means connecting said first impedance between said first output terminal and said first input terminal, means connecting said second impedance between said second output terminal and said first input terminal, means connecting said third impedance between said second input terminal and said cathodes, means connecting said anode of said first path to said first output terminal, means connecting said anode of said second path to said second output terminal, means connecting said control electrode of said second path to said second input terminal, and means for connecting said third conductor to said control electrode of said first path.

2. In combination, a balanced network having impedance arms interconnecting a pair of input terminals and a pair of output terminals, an output circuit interconnecting said output terminals and including signal responsive means normally maintaining said circuit open and actuable to close said circuit, signalling means for supplying a signal for a first predetermined time interval of limited duration, delay means, and means including said delay means connecting said signalling means to said responsive means for impressing a signal through said delay means to actuate said responsive means to close said circuit a second predetermined time interval after the start of said signal and to reopen said circuit substantially immediately after said signal stops.

3. In combination a balanced network having impedance arms interconnecting a pair of input terminals and a pair of output terminals, potential responsive means, at least one electric discharge device of the continuous-control type having an anode, a cathode, and a control electrode, means connecting in series said output terminals, said anode, said cathode, and said responsive means, signalling means for supplying a signal during a first predetermined time interval of limited duration, means connected to said control electrode for normally maintaining said device non-conducting, delay means, and means including said delay means connecting said signalling means to said control electrode for impressing said signal through said delay means to increase the conductivity of said device gradually during a second predetermined time interval following the start of said signal and to render said device non-conducting substantially immediately after signal stops.

4. In combination a balanced network having impedance arms interconnecting a pair of input terminals and a pair of output terminals, and output circuit interconnecting said output terminals and including signal responsive means normally maintaining said circuit open and actuable to close said circuit, signalling means for supplying a signal for a first predetermined time interval of limited duration, delay means, and means including said delay means connecting said signalling means to said responsive means for impressing said signal through said delay means to actuate said responsive means to close said circuit a second predetermined time interval after the start of said signal and to open said circuit substantially immediately after said signal stops, the said signal responsive means including electric discharge means of the continuous control type and control means for said discharge means such that during said second predetermined time interval the conduction through said output circuit is gradually increased until said circuit reaches the closed condition.

References Cited in the file of this patent

UNITED STATES PATENTS

| | | |
|---|---|---|
| 2,389,615 | Eder | Nov. 27, 1945 |
| 2,703,383 | Anger | Mar. 1, 1955 |

FOREIGN PATENTS

| | | |
|---|---|---|
| 120,229 | Australia | July 27, 1945 |
| 683,962 | Germany | Nov. 20, 1939 |